United States Patent
Greene et al.

(10) Patent No.: US 6,212,177 B1
(45) Date of Patent: Apr. 3, 2001

(54) REMOTELY ACCESSIBLE KEY TELEPHONE SYSTEM

(75) Inventors: Steven Greene, Larchmont, NY (US); Richard C. Bozzuto, Jr., Westport, CT (US)

(73) Assignee: IPC Information Systems, Inc., New York, NY (US)

( * ) Notice: Subject to any disclaimer, the term of this patent is extended or adjusted under 35 U.S.C. 154(b) by 0 days.

(21) Appl. No.: 08/657,396

(22) Filed: Jun. 3, 1996

(51) Int. Cl.$^7$ .................................................. H04L 12/64
(52) U.S. Cl. .......................... 370/352; 370/463; 379/156
(58) Field of Search .................................. 379/156, 90.01, 379/93.01, 93.02, 93.03, 93.04, 93.05, 93.06, 93.07, 93.09, 93.14, 93.17, 157, 201, 210, 211, 212, 164, 165, 162, 265; 370/352, 353, 354, 355, 356, 400, 401, 410, 422, 420, 463, 259, 260, 270, 381, 388; 375/260

(56) References Cited

U.S. PATENT DOCUMENTS

| | | | |
|---|---|---|---|
| 5,392,345 | * | 2/1995 | Otto ...................................... 379/265 |
| 5,608,786 | * | 3/1997 | Gordon . |
| 5,623,489 | * | 4/1997 | Cotton et al. ......................... 370/381 |
| 5,721,909 | * | 1/1998 | Hara ...................................... 379/156 |

OTHER PUBLICATIONS

C Yang, "INETPhone: Telephone Services and Servers on Internet," Network working group RFC 1789, pp 1–6, Apr. 1995.*

McNich, "Screen–Based Telephony," IEEE Communications Magazine, pp 34–38, Apr. 1990.*

* cited by examiner

Primary Examiner—Huy D. Vu
(74) Attorney, Agent, or Firm—Morgan & Finnegan, LLP

(57) ABSTRACT

A remote access system for a trader turret telephone switching network. A line status display is created at the remote site using the Internet as a data channel. A line command can be entered remotely using a "mouse" (or other graphical interface) and communicated back to the switching network via the Internet. A voice channel can then be established to the remote site via the public telephone switching network or via the Internet.

11 Claims, 1 Drawing Sheet

REMOTELY ACCESSIBLE KEY TELEPHONE SYSTEM

BACKGROUND THE INVENTION

A line telephone stations, often referred to as "trader turrets", are widely used in financial trading networks such as between banks, brokerage houses, and other types of financial institutions. Telephones of this type provide access to a large number of telephone lines, typically a hundred or more. A line is selected by depressing a single key. A trading room can include many telephone key stations so that many transactions can be completed simultaneously.

Each key telephone station in a trading room has voice channel access to other stations in the trading room and to a large number of outside lines of different types (public, private, four wire etc.) Normally each outside line is available at several stations so that any one of several traders can pickup an incoming call. A status indication is provided for each voice channel at each station where the line is available to indicate ringing, busy, hold, idle, conference, etc. The status line indications are supplied through a separate data channel for all the lines available at a station. This status information is invaluable to the operator since it provides an overall picture of the trading activity. A major obstacle to providing remote turret interconnections to a trading room, however, is the difficulty in providing the necessary data channel information of line status to the remote location.

SUMMARY OF THE INVENTION

The system according to the invention provides both a voice channel and a data channel to a remote trader turret via public networks. The voice channel is preferably established using the public telephone network. The data channel is established via the Internet. The World Wide Web (WWW) is used to supply graphical information via the Internet to provide a line status display at the remote site. The channels on these two public networks are coordinated to provide remote access to the trading room switching network. With this arrangement a trader can engage in trading activities from a home office or while traveling.

Alternatively, the Internet can be used to provide a voice channel so that the Internet provides both the data channel and the voice channel.

To set up the system, the remote operator contacts the office web site by giving the necessary passwords and by then identifying the remote site for the Internet connection and the telephone number of the remote location. The office equipment supplies a screen display via the Internet giving the status of all the lines accessible to the particular trader. When the remote operator wishes to take an incoming call shown to be ringing on the remote screen, the remote operator uses a mouse to "click" on the ringing screen indication. The office system connects to the calling party and then dials the remote trader via the public telephone system to connect the parties. A similar procedure is used for placing a call from the remote location. The remote operator "clicks" on the display indication for the desired party. The office system calls the remote party on the public telephone system and then connects to the party being called.

The remote operator can use a personal computer with a high speed modem for connection to the Internet plus an ordinary telephone connection. For mobility, a laptop type computer could be used and the modem could be connected via a cellular telephone network. The remote access according to this invention does not match the speed or flexibility of the trader turret system at the office, but does provide the much needed access to the system when working at home or while traveling.

BRIEF DESCRIPTION OF THE DRAWINGS

A preferred embodiment of the invention is illustrated in the drawings which are part of the specification and wherein.

DETAILED DESCRIPTION OF A PREFERRED EMBODIMENT

Figure 1:
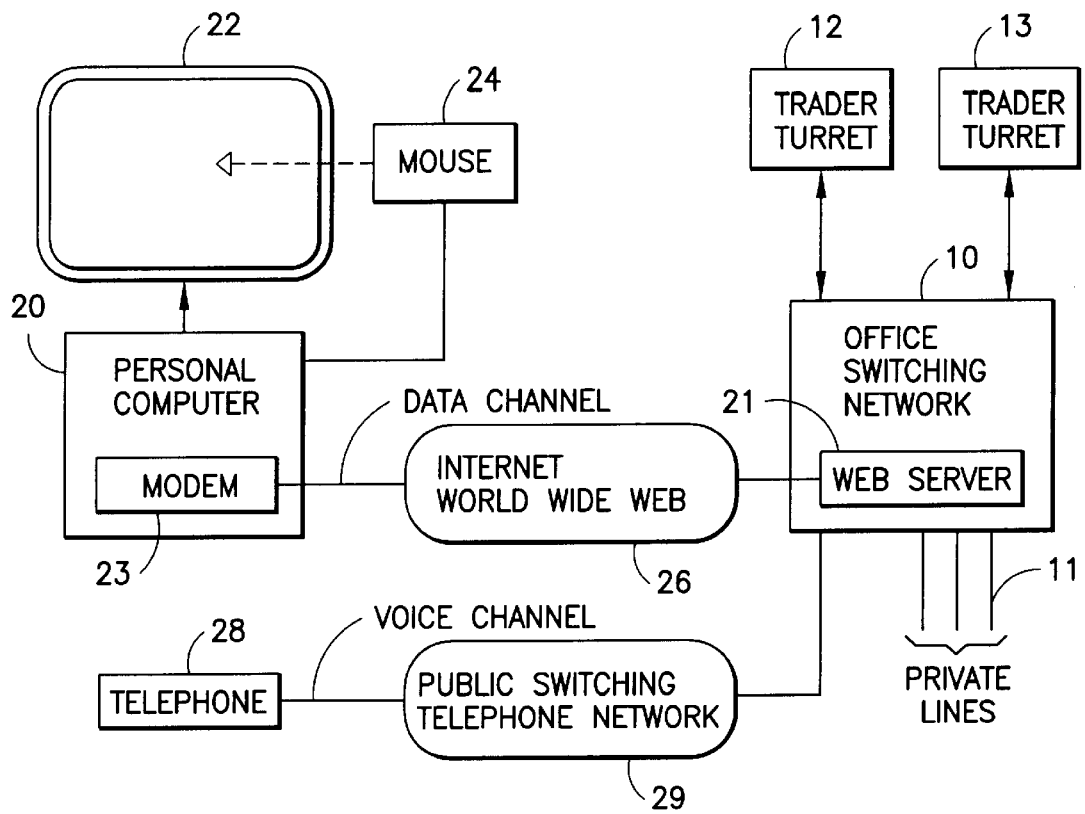
FIG. 1 is a block diagram illustrating the system according to the invention.

FIG. 1 illustrates a typical office switching network 10 which includes the back room switching gear such as in the MX system sold by IPC Information Systems Inc., assignee of this application. Trader turrets (key telephones) 12 and 13 are coupled to the switching network which establishes a voice path to selected lines 11. In most cases lines 11 are private lines connecting to other brokers and financial traders. Line cards within the switching network 10 maintain the status of each of the lines. The status information is distributed to each of the trader turrets where the information is displayed for use by the trader. A typical trading room may have hundreds of line connections and each trader turret has access to 30 or more of these lines.

Figure 2:
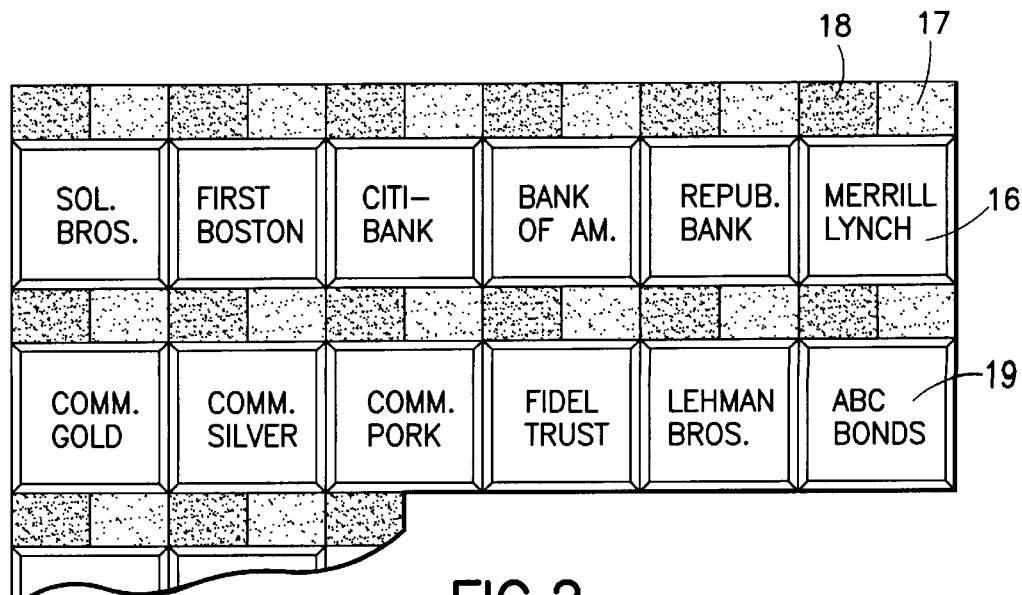
FIG. 2 is a line status display which may appear on the trader turret or the video display.

A display at a trader turret may appear as generally shown in FIG. 2. Each line key is associated with a trading partner. For example, line key 16 may be identified with "Merrill Lynch", line key 19 may be identified with "ABC Bonds", etc. A pair of indicating lights is associated with each of the line keys. Indicator light 18 may be green and indicate the line is in use by a steady on condition, or the line is ringing by a rapid flashing condition, or the line is on hold by a slow flashing. The other indicating light 17 can be amber in color and when lit indicates that the associated line is connected to the station where the amber light appears. If lights 17 and 18 are both off, then the associated line is not in use and may be seized by any trader turret having access to the line.

A personal computer 20 is used to create a remote line status display on the computer screen 22. The screen display can simulate the line status display on the trader turret and appear on the screen like the display shown in FIG. 2. The computer preferably includes a "mouse" 24 which can "click" on the line keys of the display. A data channel is established between office switching network 10 and the personal computer to communicate the line status information for creating the line status display on the screen. The publicly available Internet World Wide Web (WWW) 26 can be used as a data channel between a web server 21 in the office switching network and a modem 23 in the personal computer. Alternatively, in place of a modem, a network connection, such as an ISDN connection, can be used. The Internet can also be used to provide password access and can be used to supply a telephone number for reaching the trader. A voice channel can be completed from the office switching network to a telephone 28 via the public switching telephone network 29. Alternatively, the Internet can be used to establish the voice channel.

The personal computer can be a home computer with sufficient capacity to create a high resolution color display from data received on the data channel via the Internet. Alternatively the computer can be a lap-top type computer that can be coupled to the office switching network through a cellular telephone network. The modem is preferably a high speed modem to reduce the time required to update the screen display. A network connection can be used in place of a modem for the data channel.

In operation the remote trader first contacts the web server via the Internet. After supplying the correct password, the data channel is established between the office switching network and the personal computer. Line status information is supplied to the remote computer and a display similar to that in FIG. 2 is created on the screen. The line status is periodically updated.

To answer a ringing call indicated by a flashing indication, the trader operator clicks on the associated key displayed on the screen. The office switching network calls the associated telephone 28 via the public telephone system 29 and connects the telephone to the indicated calling party.

To seize an idle line, the trader similarly clicks on the desired line key. The office switch calls the associated telephone via public network 29 and then connects the telephone to the called party.

To pick up a party on hold, the remote trader clicks on the line key associated with the party and the office switch then connects the holding party to the associated remote telephone. A similar procedure is used to add-on to a conference call.

Although only one illustrative embodiment has been described in detail, it should be obvious that there are many variations and alternatives within the scope of this invention. The invention is defined in the appended claims.

What is claimed is:

1. A remote access system for connecting a remote station to an office network of the type including a plurality of private line key telephones, comprising:
   a) an office switching network for interconnecting private telephone line communications;
   b) a plurality of key telephones coupled to said office switching network, each of said telephones
      1) providing access to a plurality of private telephone lines, and
      2) providing line status information for the telephone lines accessible from said key telephone;
   c) a remote computer including means for establishing a data channel communication between said office switching network and said remote computer via public network;
   d) means in said office switching network and said remote computer for creating a line status display at a remote location indicating the status of lines accessible in said office switching network;
   e) means at said remote computer for selecting accessible lines indicated in said remote line status display and communicating said selection to said office network; and
   f) means in said office network for connecting a selected line to a telephone at said remote location site according to said selection via public network and independent of said data channel communication.

2. The remote access system according to claim 1 wherein said data channel communication between said office switching network and said remote computer is via a public access data channel.

3. The remote access system according to claim 2 wherein said data channel communication is via the Internet.

4. The remote access system according to claim 1 wherein said line status display is on a video screen controlled by said remote computer.

5. The remote access system according to claim 4 wherein said means for selecting accessible lines at said remote computer includes a user interface for selecting portions of said video screen line status display for changing line status.

6. The remote access system according to claim 1 wherein said means for connecting a selected line establishes a voice channel via the public telephone switching network.

7. The remote access system according to claim 1 wherein said means for connecting a selected line establishes a voice channel via the Internet.

8. A method of establishing remote access to a private line office network including a plurality of key telephone stations with line status information being displayed at said telephone stations, including the steps of:
   a) establishing a data channel between said private line office network and a computer at a remote site via public network;
   b) establishing a remote line status display at said remote site based on data received via said data channel;
   c) selecting an accessible line from said remote line status display at said remote site;
   d) communicating said selection from said remote site to said private line office network via said data channel;
   e) establishing a voice channel independent of said data channel to said remote site via public network according to said selection from said remote site.

9. A method of establishing remote access to an office network according to claim 8 wherein said data channel is established via Internet.

10. A method of establishing remote access to an office network according to claim 8 wherein said voice channel is established via the public telephone switching network.

11. A method of establishing remote access to an office network according to claim 8 wherein said voice channel is established via the Internet.

* * * * *